COMPATIBLE SINGLE-SIDEBAND TRANSMITTER

Filed April 7, 1964 2 Sheets-Sheet 1

INVENTOR
WINSLOW R. REMLEY

BY Richard H. Smith

AGENT

United States Patent Office 3,323,064

Patented May 30, 1967

3,323,064

COMPATIBLE SINGLE-SIDEBAND TRANSMITTER

Winslow R. Remley, Bethesda, Md., assignor to International Business Machines Corporation, New York, N.Y., a corporation of New York Filed Apr. 7, 1964, Ser. No. 357,887
2 Claims. (Cl. 325—137)

The present invention relates to compatible single-sideband (CSSB) transmission and, more particularly, relates to a CSSB transmitter and method of transmission wherein the message function is embodied in the square of the envelope of the modulated signal.

The bandwidth economy of conventional single-side-band (SSB) transmitters is obtained only at the sacrifice of receiver frequency sensitivity. In recent years "hybrid" systems have been developed which possess both the desirable bandwidth conservation features of SSB and the desirable frequency insensitivity features of conventional amplitude modulation (AM). Such "hybrid" systems embody information in the envelope of a transmitted waveform having SSB bandwidth characteristics and utilize envelope detection techniques, which are relatively frequency insensitive, at the receiver. Communication systems of this type have come to be known as compatible single-sideband (CSSB) systems.

One species of CSSB system is disclosed in an article entitled "The Compatibility Problem in Single-Sideband Transmission" appearing in the Proceedings of the IRE for Aug. 1960 at page 1431. There it is noted that absolute compatibility with an AM receiver employing a linear envelope detector cannot possibly be achieved with the spectral economy of conventional SSB. It is stated, however, that relatively distortion free reception may be achieved by conveying the message function in the square of the envelope of a hybrid waveform occupying a spectral width equal to that of a conventional SSB signal. Substantially distortionless detection is achieved by employing a square-law envelope detector, rather than the linear envelope detector used in previous CSSB systems.

In thus achieving transmission of a message signal in a narrow bandwidth channel equivalent to that of SSB and obtaining distortionless reception of that signal through the relatively frequency insensitive technique of square-law envelope detection, a highly desirable CSSB system, combining two of the best features of SSB and AM, has been made available.

Unfortunately, however, the implementation of a square-law SCCB transmitter has been found to be most difficult. Such implementation has required such complicated and expensive components as logarithmic function generators and wide-band 90° phase shifting networks, making the transmitter unsuited, from both economical and size standpoints, for many of the applications where square-law CSSB is most in demand. For example, square-law CSSB is ideally suited for mobile communications applications (e.g., airborne and vehicular) where Doppler effect problems make frequency insensitive reception highly desirable. Yet such mobile systems usually call for a high number of transmitters in relation to the number of receivers. Often the ratio is one-to-one. This makes low cost transmitters mandatory. It is further necessary that the transmission equipment utilized in such systems be compact and lightweight since size and weight limitations are understandably severe.

It is therefore an object of the present invention to provide an improved square-law CSSB transmitter.

Another object is to provide an improved method for generating a square-law CSSB waveform.

A further object is to provide a square-law CSSB transmitter that is compact and lightweight.

Yet another object is to provide a square-law CSSB transmitter that does not utilize a logarithmic function generator or a wide-band 90° phase shifting network.

Still another object is to provide a circuit which may be readily inserted in a conventional SSB transmitter to convert the latter to operation in accordance with the principles of the present invention.

In accordance with a first aspect of the present invention a method is provided for simulating, at the transmitter, the distortion effects which SSB transmission and square-law detection would have upon a modulating (e.g., audio) signal and for developing a distortion signal representative of those effects. The original modulating signal is then modified by this distortion signal so that a predistorted modulating signal, detectible substantially without distortion by a square-law detector, is generated.

Additional aspects of the invention provide two substantially different means for carrying out this simulation method in an SSB transmitter. A first means utilizes one or more predistortion circuits in combination with a conventional SSB transmitter in such a manner that the modulating signal passes once through each predistortion circuit and experiences single order correction in each. A second means substantially reduces the number of circuit components required for multi-order signal correction by incorporating portions of the SSB transmitter into a single predistortion circuit which operates on a feedback principle to produce a degree of signal correction equivalent to that produced by a plurality of the predistortion circuits of the above-mentioned first type.

The foregoing and the other objects, features and advantages of the invention will be apparent from the following more particular description of preferred embodiments of the invention, as illustrated in the accompanying drawings.

In the drawings:

FIG. 7 is a schematic block diagram of a transmitter constructed in accordance with the present invention.

Figure 1:
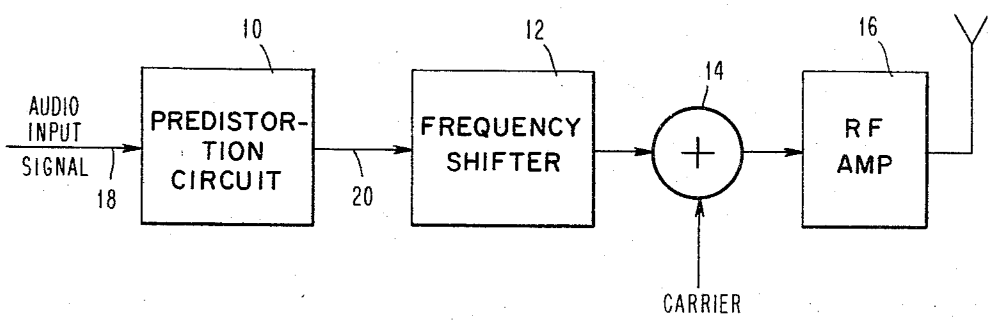

For a complete understanding of the present invention it is best to first consider the effect which square-law detection has upon a convention SSB modulated signal. The modulating signal (i.e., audio) introduced into the transmitter may be, as conventionally represented, the general waveform $$E(t) \cos \phi(t) \qquad (1)$$

The functions performed by the transmitter are to shift the frequency band of this signal upwardly (without increasing its width) to derive a waveform $$E(t) \cos [\phi(t)+\omega_c t]$$

and to add to this waveform a carrier of amplitude $A_c$ and frequency $\omega_c$, deriving a modulated signal $$E(t) \cos [\phi(t)+\omega_c t]+A_c \cos \omega_c t \qquad (2)$$

Square-law detection of the modulated signal 2 involves squaring it to obtain a signal $$E^2(t)½\{1+\cos [2\phi(t)+2\omega t]\}$$
$$+A_c^2/2(1+\cos 2\omega_c t)$$
$$+E(t)A_c\{ \cos [\varphi(t)+2\omega_c t]\}$$

which is put through a low-pass filter to eliminate high frequency terms, yielding $$\underbrace{E(t)A_c \cos \phi(t)}_{S} + \underbrace{\tfrac{1}{2}E^2(t)}_{D} \qquad (3)$$

The detected signal represented by waveform 3, it will be noted, embodies a component S which is proportional to the modulating signal 1 and which conveys the information carried by that signal. The component D is an error or distortion component which occupies the same frequency band as the component S and which obscures receiver recognition of the latter. The degree to which the distortion component D obscures the signal component S is indicated by a computation of the ratio in which the power in the signal 3, as detected at the receiver, is distributed between the S and D terms. The ratio may be represented as $$\left(\frac{S}{D}\right) \text{power} = 2\frac{\text{Carrier Power}}{\text{Signal Power}}$$

where the right-hand term represents the ratio of transmitted carrier power to transmitted signal power. This latter ratio, it would appear, may be arbitrarily increased in order to yield any signal to distortion ratio desired. Unfortunately, however, practicalities such as cost of carrier generation and carrier noise present at the receiver make large carrier to signal transmission power ratios prohibitive. Therefore, when the transmitted carrier to signal ratio is set at a level considered to be a reasonable design objective, e.g., 2, the detected signal to distortion ratio for the above-discussed straight-forward SSB square-law detection scheme is four-unacceptably low for most purposes.

The present invention utilizes the principle of controlled predistortion of the modulating signal so that the distortion component present in the frequency band of the detected replica of the modulating signal is suppressed to where its effects are minimal. As shown in FIG. 1 a predistortion circuit 10 receives a modulating (i.e., audio input) signal 18 and converts it to a predistorted modulating signal 20 which is fed for transmission into a conventional SSB generator represented by a frequency shifter 12, a carrier adder 14 and a radio frequency amplifier 16.

Figure 2:
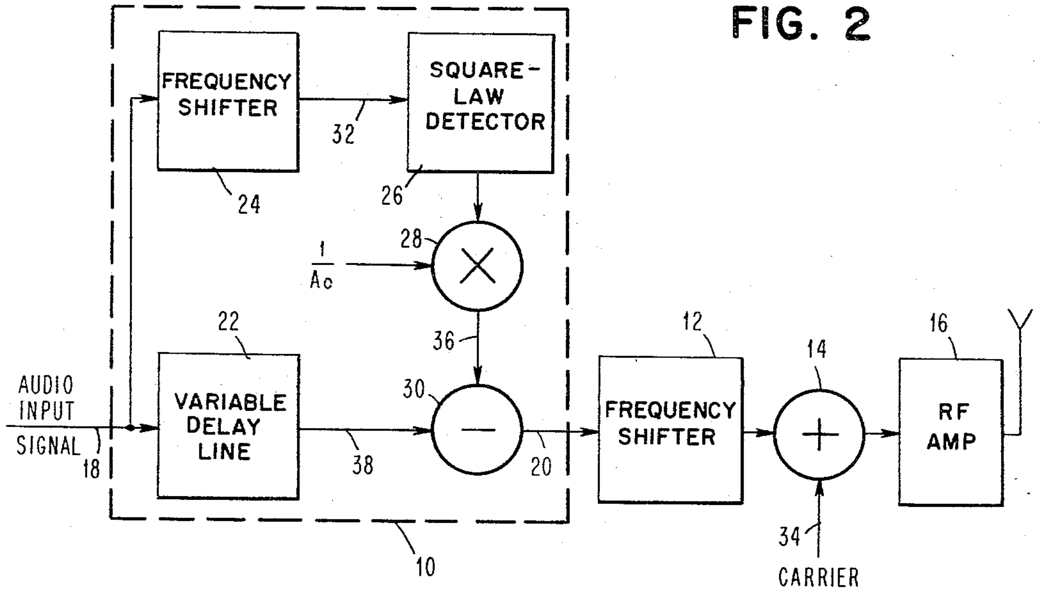
FIG. 2 is a block diagram of a preferred embodiment of the invention, showing the details of the predistortion circuit in relation to an SSB generator.

FIG. 2 illustrates the predistortion circuit 10 in more detail. The modulating signal 18 is applied concurrently to a variable delay line 22 and a frequency shifter 24. The frequency shifter 24 may be any conventional frequency shifter capable of moving the frequency spectrum of the modulating signal upwardly by a constant amount equal to at least the highest frequency component of the modulating signal. A shift of from 10 to 20 times this amount is preferred in actual use.

The shifted modulating signal 32 is put through a square-law detector 26 comprising a conventional squaring circuit and low-pass filter. The filter eliminates substantially all the frequency components of the squared signal which lie outside the frequency band of the modulating signal. A multiplier 28 scales the amplitude of the filtered signal by a constant scaling factor equal to the reciprocal of the amplitude of the carrier signal 34. The scaled signal 36 is applied to the subtrahend input of a subtracting circuit 30.

The frequency shifter 24 and the square-law detector 26 operate upon the modulating signal 18 in substantially the same manner as the frequency shifter of a conventional SSB generator and the square-law detector at a receiver would act upon the signal had it been transmitted in the manner previously described (without predistortion). This means that the signal 36 is a replica (scaled by $1/A_c$) of the D term of waveform 3, supra. No S term appears in the signal 36 because a carrier addition operation corresponding to that mathematically represented in waveform 2, supra, is not duplicated in the predistortion circuit 10.

The distortion signal 36 is subtracted from the modulating signal 18 by the subtractor 30. The delay line 22 is provided to compensate for any delay (phase shift) occurring in the circuits 24, 26, and 28. The minuend input signal 38 and the subtrahend input signal 36 are thus in phase as well as in the same frequency band. Of course, if no phase delay is introduced in the circuits 24, 26, and 28, the need for delay line 22 is obviated.

The remainder output signal 20 is termed a "predistorted modulating signal" because it has been modified in a manner tending to remove those components of the original modulating signal which would have given rise, upon subsequent square-law detection, to the distortion term D of waveform 3, supra. Proper removal of these components at the receiver depends upon the cancellation of the D term of waveform 3, supra, by the term introduced in the predistortion circuit through the subcontractor 30. The need for a scaling factor of $1/A_c$ in the predistortion circuit thus becomes apparent since subsequent cross modulation of the predistorted modulating signal 20 with a carrier 34 of amplitude $A_c$ would otherwise render these two competing terms of unequal amplitude, unsuited for cancellation purposes.

It is to be noted that while the predistortion circuit 10 eliminates the first-order error from the modulating signal, a second-order error is bound to be introduced through the simulated square-law detection operation performed by the circuit. Due to the minimizing effect of the scaling bias $1/A_c$, however, the second-order distortion is of a smaller magnitude than the first-order distortion.

It can be shown that a modulated signal generated by the transmitter of FIG. 2 has a detected signal to distortion power ratio of $$\left(\frac{S}{D}\right) \text{power} = 2\left(\frac{\text{Carrier Power}}{\text{Signal Power}}\right)^2$$

Therefore, the signal to distortion ratio is double (8:1) what it was (assuming the same transmitted carrier to signal power ratio) for the previously analyzed system not employing a predistortion circuit.

Figure 3:
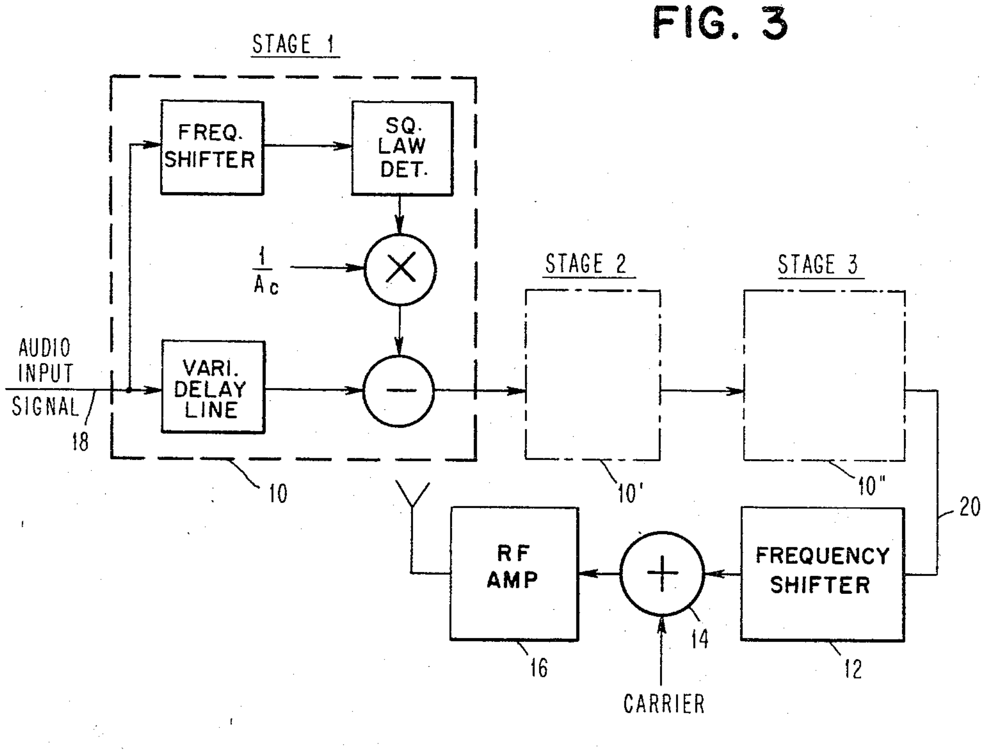
FIG. 3 is a block diagram showing the transmitter of FIG. 2 with three pedistortion circuits in cascade.

A modification of the transmitter of FIG. 2 is shown in FIG. 3. Three predistortion circuits 10, 10′, and 10″ are arranged in cascade so that the distortion component is rendered progressively smaller as the modulating signal 18 passes through the several predistortion stages. Circuits 10′ and 10″ are identical to circuit 10. The three-stage predistortion circuitry produces a modulated signal having a detected signal to distortion power ratio of 128:1 (assuming, once again, a transmitted carrier to signal power ratio of 2) since the general formula $$\left(\frac{S}{D}\right) \text{power} = 2\left(\frac{\text{Carrier Power}}{\text{Signal Power}}\right)^{2n}$$

where $n$ equals the number of predistortion circuits, may be used to evaluate the $S/D$ ratio of such a multi-stage system.

A transmitter according to the present invention may be constructed simply by adding a predistortion circuit 10 to the input of any conventional SSB generator presently in use. Of course, cascade arrangements of the type indicated in FIG. 3 may be employed whenever greater signal correction is desired.

Figure 4:
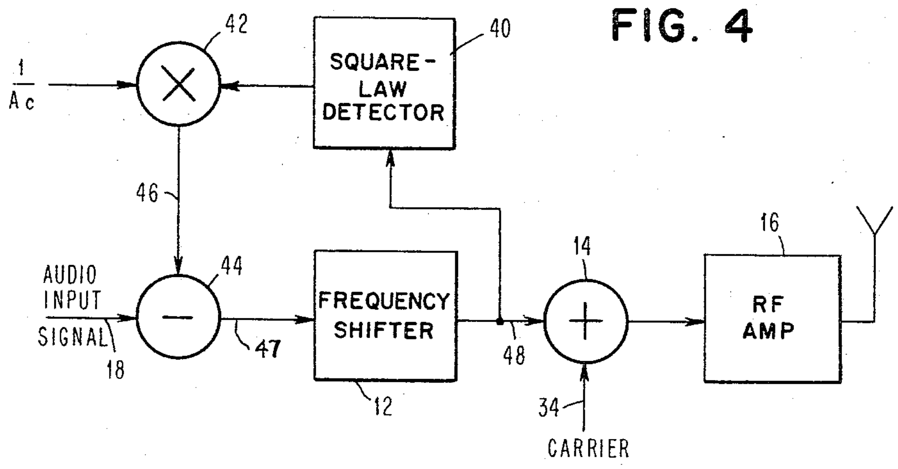
FIG. 4 is a block diagram of a second embodiment of the invention employing a closed loop predistortion circuit.

Referring now to FIG. 4, a second embodiment of the present invention will be described. As in the previous embodiment, the frequency shifter 12, carrier adder 14, and amplifier 16 may be those of a conventional SSB generator, although for reasons soon to be made clear, the frequency shifter 12 of the present embodiment must be one which substantially preserves the phase of the signal. Most SSB generators in use today would require some modification to meet this latter requirement and for this reason the present embodiment is not as readily adaptable to existing apparatus as is the FIG. 1 embodiment.

The square-law detector 40, multiplier 42, and subtractor 44 correspond identically, in both structure and function, to the components 26, 28, and 30 employed previously. It will be noted, however, that these components are arranged, together with frequency shifter 12, in a feedback loop which supplies a distortion signal 46, corresponding to the signal 36 of FIG. 2, for modifying the input signal 18. This loop configuration combines the functions of the two frequency shifters 12 and 24 of the previous embodiment and thus eliminates the need for the separate predistortion frequency shifter 24. A predistorted modulating signal corresponding to the signal 20 of FIG. 1, appears at 47. The loop arrangement of FIG. 4 provides a degree of signal correction equivalent to that attained by a multi-stage configuration such as that shown in FIG. 3.

If the feedback loop produced no phase shift in the signal, 100 percent distortion elimination would be possible so long as a transmitted carrier to signal power ratio of greater than unity was employed. This ideal condition is not attainable in practice. However, it can be shown that if a transmitted carrier to signal power ratio of 4 is utilized, and if the phase shift in the feedback network is kept within the reasonably attainable limit of 10 degrees, a signal to distortion ratio of approximately 100 is achieved at the receiver. This is more than adequate for any audio application.

The various circuits designated by the blocks of FIGS. 1–4 are all well-known in the radio art and may be of the type disclosed in basic handbooks and textbooks. For example, Seely, Electron-Tube Circuits, 2nd ed., McGraw-Hill (1958) discusses subtracting circuits (blocks 30 and 44) at page 246, adding circuits (block 14) at page 251, a low-pass filter at page 260, a multiplying circuit (blocks 28 and 42) at page 267, frequency shifters (block 12) at page 555, and a square-law detector (blocks 26 and 40) at page 575.

While the invention has been particularly shown and described with reference to preferred embodiments thereof, it will be understood by those skilled in the art that various changes in form and details may be made therein without departing from the spirit and scope of the invention.

What is claimed is:

1. A transmitter for generating a modulated signal having a bandwidth equal to the bandwidth of an information-bearing modulating signal and having an envelope which reduces, through square-law detection, to an accurate replica of said modulating signal, said transmitter comprising:

a closed loop including subtraction means, frequency shifting means and square-law detection means, said subtraction means having a minuend input for receiving said modulating signal, a subtrahend input and a remainder output, said frequency shifting means being adapted to shift upwardly the frequency band of the remainder signal issuing from said output of said subtraction means, thereby producing an intermediate signal which is square law detected by said square-law detection means and passed to the subtrahend input of said subtraction means;

means for generating a carrier signal of substantially constant frequency; and means for combining said carrier signal with said intermediate signal to adapt the latter for transmission and subsequent square-law detection.

2. A transmitter for generating a modulated signal having a bandwidth equal to the bandwidth of an information-bearing modulating signal and having an envelope which reduces, through square-law detection, to an accurate replica of said modulating signal, said transmitter comprising:

a closed loop including subtraction means, frequency shifting means, squaring means, filtering means and scaling means, said subtraction means having a minuend input for receiving said modulating signal, a subtrahend input and a remainer output, said frequency shifting means being adapted to shift upwardly the frequency band of the remainder signal issuing from said output of said subtraction means, thereby producing an intermediate signal which is square law detected by said squaring means; which squared signal is confined to substantially the frequency band of said modulating signal by said filtering means; and which filtered squared signal is scaled by a constant scaling factor by said scaling means and passed to the subtrahend input of said subtraction means;

means for generating a carrier signal of substantially constant frequency and having a peak amplitude which has a magnitude equal to the reciprocal of the magnitude of said scaling factor; and means for combining said carrier signal with said intermediate signal to adapt the latter for transmission and subsequent square-law detection.

References Cited

UNITED STATES PATENTS

| | | | |
|---|---|---|---|
| 2,298,930 | 10/1942 | Decino | 332—37 |
| 2,777,900 | 1/1957 | Cowan | 325—126 X |
| 2,849,537 | 8/1958 | Eglin | 325—50 X |
| 2,989,707 | 6/1961 | Kahn | 332—45 |
| 3,085,203 | 4/1963 | Logan et al. | 332—45 X |
| 3,188,581 | 6/1965 | Palmer | 325—50 X |
| 3,244,807 | 4/1966 | Richman | 178—6 |
| 3,295,072 | 12/1966 | Van Kessel | 332—41 |

JOHN W. CALDWELL, *Acting Primary Examiner.*

B. V. SAFOUREK, *Assistant Examiner.*